United States Patent
Koide

(10) Patent No.: US 11,378,935 B2
(45) Date of Patent: Jul. 5, 2022

(54) NUMERICAL CONTROL DEVICE

(71) Applicant: FANUC CORPORATION, Yamanashi (JP)

(72) Inventor: Naoya Koide, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 313 days.

(21) Appl. No.: 16/692,258

(22) Filed: Nov. 22, 2019

(65) Prior Publication Data

US 2020/0183360 A1 Jun. 11, 2020

(30) Foreign Application Priority Data

Dec. 10, 2018 (JP) .............................. JP2018-230724

(51) Int. Cl.
G05B 19/4155 (2006.01)

(52) U.S. Cl.
CPC .................. G05B 19/4155 (2013.01); *G05B 2219/35521* (2013.01)

(58) Field of Classification Search
None
See application file for complete search history.

(56) References Cited

U.S. PATENT DOCUMENTS 5,528,506 A * 6/1996 Yoshida ............. G05B 19/4103
318/571
2018/0032054 A1* 2/2018 Kumagai ............. G05B 19/409

FOREIGN PATENT DOCUMENTS

JP  H11-338530 A  12/1999
JP  2012-022404 A  2/2012

OTHER PUBLICATIONS

An Office Action; "Notice of Reasons for Refusal", mailed by the Japanese Patent Office dated Jun. 1, 2021, which corresponds to Japanese Patent Application No. 2018-230724 and is related to U.S. Appl. No. 16/692,258; with English language translation.

* cited by examiner

*Primary Examiner* — Sean Shechtman
(74) *Attorney, Agent, or Firm* — Studebaker & Brackett PC

(57) ABSTRACT

A numerical control device according to the present invention is for a machine tool which causes a tool to move along a movement path decided according to a machining program, and includes: a limit setting storage unit in which limit values of a plurality of parameter related to movement of the tool are set; a limit velocity calculation unit which calculates a plurality of limit velocities which are movement velocities of the tool, which respectively correspond to the limit values of the plurality of parameters at each position of the movement path; a feedrate determination unit which defines a minimum value among an ideal velocity of the tool and the plurality of limit velocities at each position on the movement path as a feedrate of the tool at each position on the movement path; and an adjustment effect calculation unit which calculates variation in movement time required in order to cause the tool to move an entirety of the movement path at the feedrate, in a case of changing the limit value of the parameter.

3 Claims, 5 Drawing Sheets

NUMERICAL CONTROL DEVICE

This application is based on and claims the benefit of priority from Japanese Patent Application No. 2018-230724, filed on 10 Dec. 2018, the content of which is incorporated herein by reference.

BACKGROUND OF THE INVENTION

Field of the Invention

The present invention relates to a numerical control device.

Related Art

A machine tool causes a tool to move along a movement path which is decided by a machining program. At this time, if increasing the acceleration of the tool, there are cases where error arises in movement of the tool, and the tool is not made to accurately move on the required movement path. For this reason, as described in Patent Document 1, for example, technology has been known for performing deceleration control to decelerate the tool so that the acceleration of the tool does not exceed a predetermined limit value, at a position at which the movement path curves, for example.

In addition, other than acceleration, it has been known that it is possible to more accurately move the tool by setting limit values for the jerk of the tool, the instant velocity variation for every drive axis, etc. For this reason, among numerical control devices for machine tools, there are those which perform control for decelerating the tool based on a plurality of parameters.

Patent Document 1: Japanese Unexamined Patent Application, Publication No. H11-338530

SUMMARY OF THE INVENTION

In order to shorten the machining time, it is desired to lessen the aforementioned such deceleration of the tool. Therefore, upon machining of mass-produced goods in particular, trying to shorten the machining time, even by a little by lessening the safety factor in the upper limit value of parameters used in deceleration control has been attempted. However, with a change in such a limit value, there is a risk of lowering the machining precision to exceed the permissible range. For this reason, upon changing the limit value of parameters, if it is known for which parameter it is efficient to change the limit value, it will be possible to shorten the machining time relatively easily by suppressing a decline in the machining precision.

The present invention has an object of providing a numerical control device for which shortening of the machining time is easy.

A numerical control device (for example, the numerical control device 1 described later) according to a first aspect of the present invention is for a machine tool which causes a tool to move along a movement path decided according to a machining program, the numerical control device including: a limit setting storage unit (for example, the limit setting storage unit 12 described later) in which limit values of a plurality of parameter related to movement of the tool are set; a limit velocity calculation unit (for example, the limit velocity calculation unit 25 described later) which calculates a plurality of limit velocities which are movement velocities of the tool, which respectively correspond to the limit values of the plurality of parameters at each position of the movement path; a feedrate determination unit (for example, the feedrate determination unit 26 described later) which defines a minimum value among an ideal velocity of the tool and the plurality of limit velocities at each position on the movement path as a feedrate of the tool at each position on the movement path; and an adjustment effect calculation unit (for example, the adjustment effect calculation unit 20 described later) which calculates variation in movement time required in order to cause the tool to move an entirety of the movement path at the feedrate, in a case of changing the limit value of the parameter.

According to a second aspect of the present invention, in the numerical control device as described in the first aspect, the plurality of parameters may include acceleration of the tool and jerk of the tool, and the adjustment effect calculation unit may calculate variation in the movement time for every position at which defining the limit velocity as feedrate of the tool, by way of Formula (1) below.

$$\Delta T = \frac{2Vc_R - 2Vc_P}{A} - \frac{Vc_R^2 - Vc_P^2}{AV} + \frac{A(Vc_R - Vc_P)}{JV} \quad (1)$$

In Formula (1), $\Delta T$ is variation in the movement time, $Vc_P$ is the limit velocity corresponding to the limit value prior to change, $Vc_R$ is the limit velocity corresponding to the limit value after change, V is the ideal velocity, A is the limit value prior to change of acceleration of the tool, and J is the limit value prior to change of jerk of the tool.

According to a third aspect of the present invention, the numerical control device as described in the first and second aspects may further include: a deceleration recording unit for example, the deceleration recording unit 17 described later) which sums a number of times of the feedrate determination unit defining the limit velocity as the feedrate for each of the parameters; and a count output unit (for example, the count output unit 21 described later) which displays the number of times summed by the deceleration recording unit for each of the parameters.

With the numerical control device according to the present invention, shortening of the machining time is easy.

DETAILED DESCRIPTION OF THE INVENTION

Figure 1:
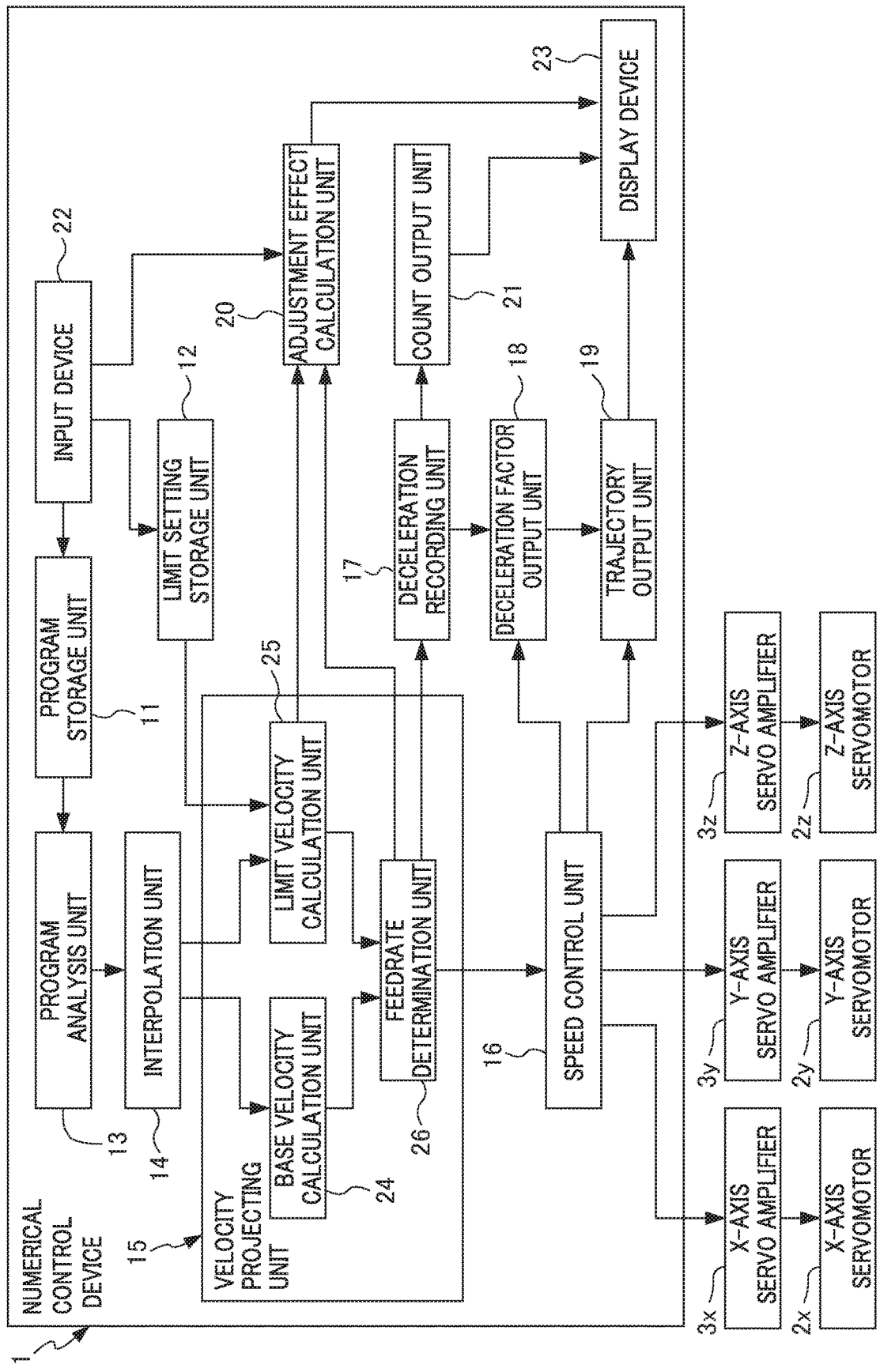
FIG. 1 is a block diagram showing the configuration of a numerical control device according to the present invention.

Hereinafter, an embodiment of the present invention will be explained while referencing the drawings. FIG. 1 is a block diagram showing the configuration of a numerical control device 1 according to an embodiment of the present invention.

The numerical control device 1 is a device for controlling a machine tool, and causes the tool to move along a movement path decided by a machining program. More specifically, the numerical control device 1 controls servo amplifiers 3x, 3y and 3z which drive each of servomotors 2x, 2y and 2z of drive axes in the mutually perpendicular X, Y and Z directions positioning the tool.

The numerical control device 1 includes: a program storage unit 11, limit setting storage unit 12, program analysis unit 13, interpolation unit 14, velocity projecting unit 15, speed control unit 16, deceleration recording unit 17, deceleration factor output unit 18, trajectory output unit 19, adjustment effect calculation unit 20 and count output unit 21, as well as an input device 22 and display device 23.

The numerical control device 1 can be configured by a computer device having a CPU, memory, etc., for example. In other words, the program storage unit 11, limit setting storage unit 12, program analysis unit 13, interpolation unit 14, velocity projecting unit 15, acceleration control unit 16, deceleration recording unit 17, deceleration factor output unit 18, trajectory output unit 19, adjustment effect calculation unit 20 and count output unit 21 can be realized by parts of a control program read into the computer (e.g., subroutine, hard program, etc.). It should be noted that these constituent elements are simply distinguished functionally, and it is unnecessary for each constituent element to be written to be separated from each other in the code of the control program.

The program storage unit 11 stores the machining program specifying the motion of the tool required in order to machine a workpiece. This program storage unit 11 can be realized as a storage space of memory, a hard disk or the like specified by the control program of the computer device constituting the numerical control device 1.

The machining program stored in the program storage unit 11 can be established as a program sequentially writing the coordinates of points at which the movement direction changes, curves of the movement path, etc., for example, in the path of the tool.

For a plurality of parameters which can be factors of positional displacement of the tool among the parameters related to movement of the tool, limit values expected as being able to suppress the positional displacement of the tool to within the maximum permissible limit are respectively set in the limit setting storage unit 12. In other words, the limit setting storage unit 12 is configured so that an operator can store limit values inputted from the input device 22, and can be realized as a storage space of memory, a hard disk or the like specified by the control program of the computer device constituting the numerical control device 1, similarly to the program storage unit 11.

As the plurality of parameters for which limit values are set in the limit setting storage unit 12, it is preferable to include instantaneous variation in velocity of each drive axis of the machine tool (velocity variation in case of velocity changing stepwise, and can be understood as velocity variation within a fixed micro-time), as well as the acceleration of the tool and jerk. For these parameters, by the values thereof increasing, it has been known that the spatial position of the tool comes to tend to shift from the theoretical spatial position, in the course of the tool moving. For this reason, by setting the limit values (upper limit values) of these parameters, it is possible to effectively suppress a shift in the tool from the movement path decided by the machining program.

The program analysis unit 13 analyzes the machining program stored in the program storage unit 11, and converts into data such as position (coordinates) and velocity of every drive axis. Since such processing is well known, explanation of the detailed operation method, etc. will be omitted.

The interpolation unit 14 interpolates the data obtained from the program analysis unit 13, and generates data for every sampling cycle. Since such processing is also well known, an explanation of the detailed operation method, etc. will be omitted.

The velocity projecting unit 15 includes an ideal velocity calculation unit 24, limit velocity calculation unit 25 and feed speed determination unit 26.

The ideal velocity calculation unit 24 is established as a unit which maintains the velocity of the tool (tangential velocity in movement direction) while moving at a predetermined velocity (for example, velocity determined according to material properties of workpiece, type of tool, etc.), excluding acceleration from tool stopped state and deceleration while stopping, and calculates, for every sampling cycle, the ideal velocity of the tool at each position of the movement path.

The limit velocity calculation unit 25, based on the profile of the movement path of the tool, calculates a plurality of limit velocities, which are the maximum movement velocities permitted of the tool corresponding to each of the limit values of the plurality of parameters at each position of the movement path, for every sampling cycle.

Figure 2:
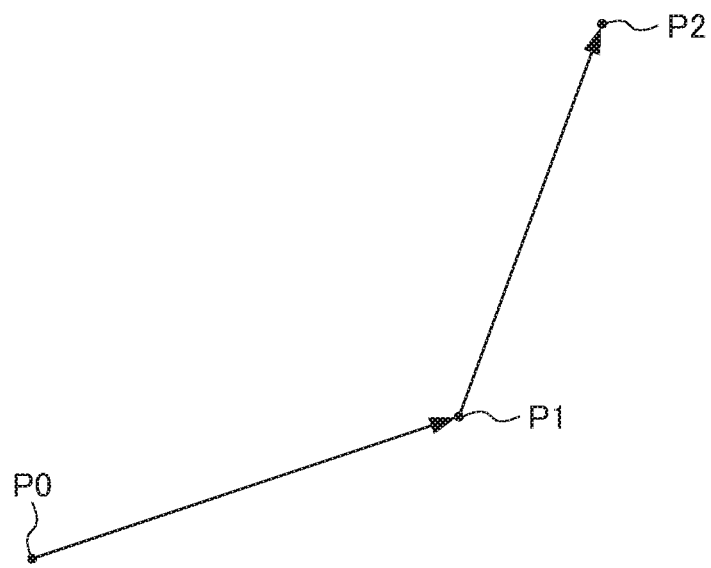
FIG. 2 is a view illustrating the movement path of a tool which is made to move by the numerical control device of FIG. 1.
Figure 3:
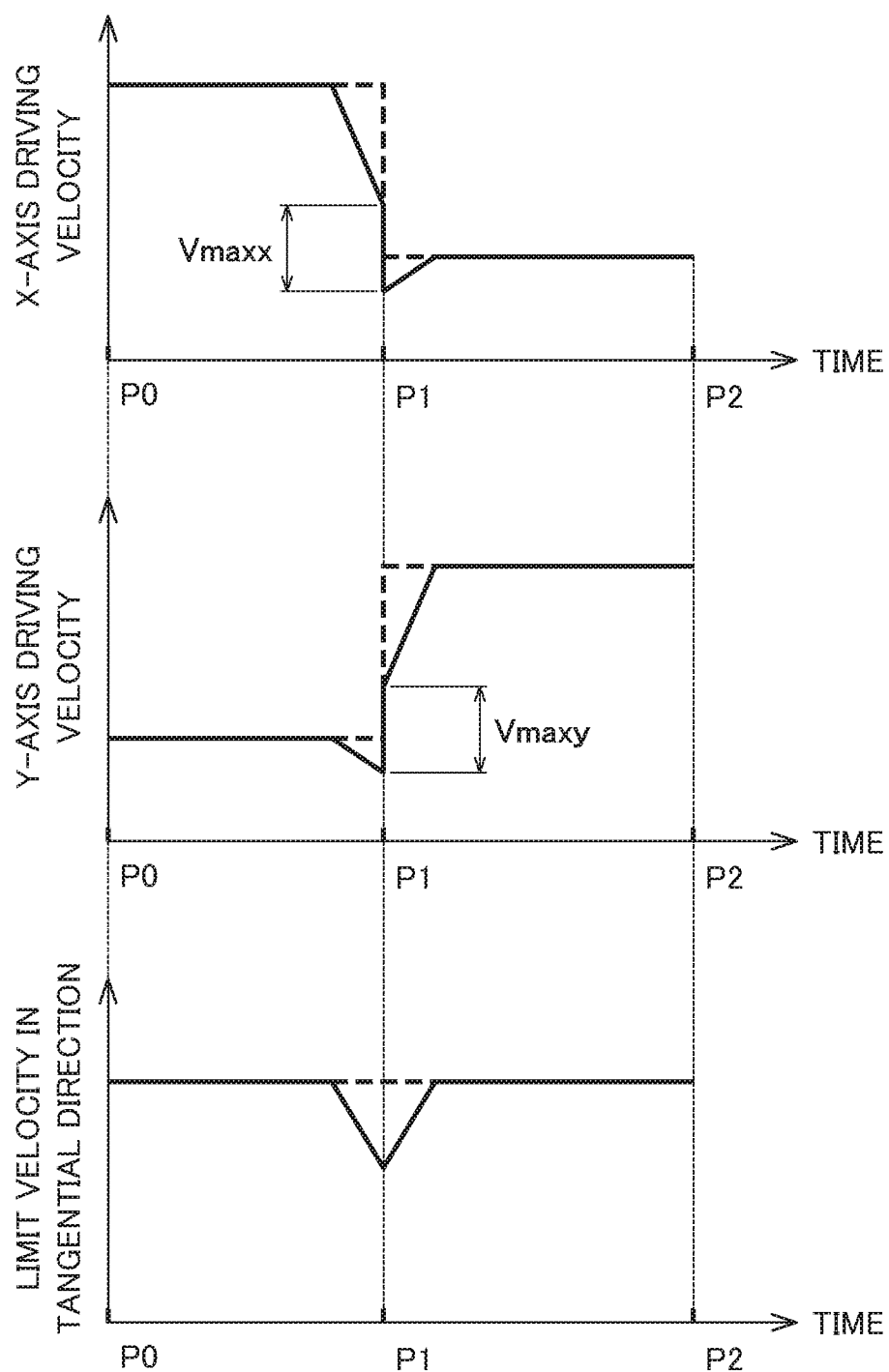
FIG. 3 is a graph illustrating a feed limit corresponding to a limit value for instantaneous variation in velocity of each drive axis, for the movement path in FIG. 2, as well as a limit velocity in a tangential direction corresponding with the driving velocities.

First, the limit velocity corresponding to the limit value for the instantaneous variation in velocity of the drive axes (servomotors 2x, 2y, 2z) will be explained. For example, in the case of the tool moving from point P0 to point P2 through point P1 as shown in FIG. 2, i.e. a case of the movement direction of the tool changing at point P1 on the movement path of the tool, will be explained. It should be noted that, for convenience of illustration, in the following explanation, it will be explained as a configuration in which the tool moves within the X-Y plane; however, naturally, the movement of the tool may include a component in the Z direction. In the case of the tool moving in the movement path of FIG. 2, when trying to maintain the absolute velocity of the tool (velocity in tangential direction of the movement path), the necessity arises for the servomotor 2x of the X drive axis and servomotor 2y of the Y drive axis to cause the drive velocity to respectively change stepwise, as shown by the dotted lines in FIG. 3 that connect the X-axis driving velocity to the Y-axis driving velocity. However, in the case of the height of this step exceeding the limit value (defined as Vmaxx, Vmaxy) for the instantaneous variation in velocity of each servomotor 2x, 2y stored in the limit setting storage unit 12, the velocity of the servomotors 2x, 2y is decelerated before and after point P1, so that the instantaneous variation in velocity of the servomotors 2x, 2y does not exceed the limit values Vmaxx, Vmaxy, as shown by the solid line in FIG. 3. The limit velocity in the tangential direction of the tool corresponding to the limit value of instantaneous variation in this velocity is calculated as the synthetic velocity of velocity components of each servomotor 2x, 2y. In the example of FIG. 3, as shown by the limit velocity in tangential direction, the limit velocity declines from before and after this to become a minimum value when passing through point P1.

Figure 4:
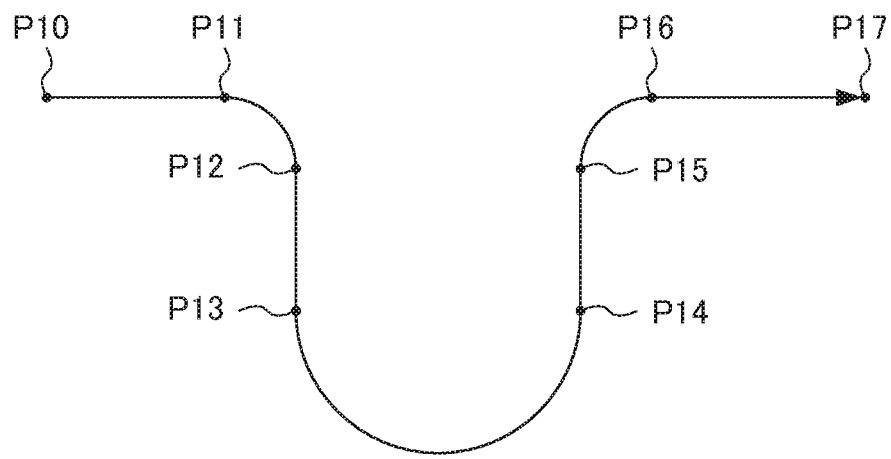
FIG. 4 is a view illustrating the movement path of a tool which can be made to move by the numerical control device in FIG. 1.
Figure 5:
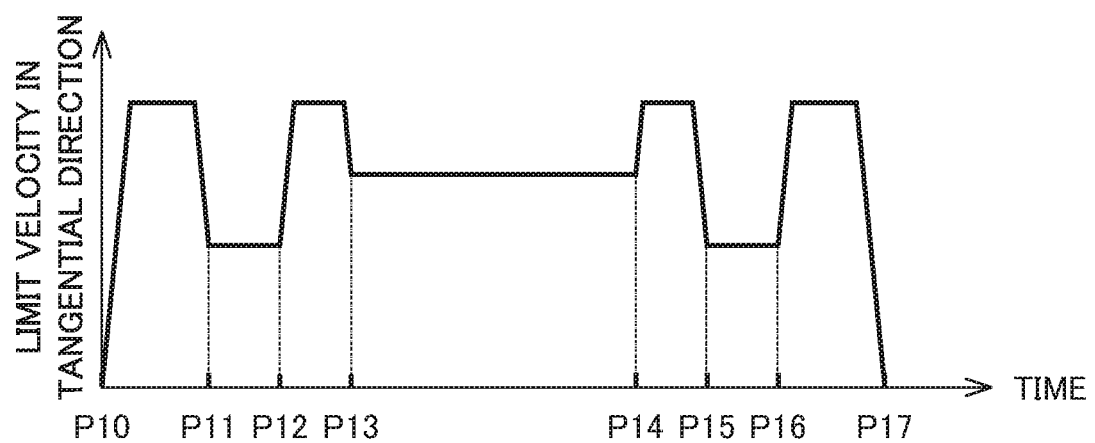
FIG. 5 is a graph illustrating the limit velocity corresponding to the limit value of acceleration of the tool, for the movement path in FIG. 4.

Next, the limit velocity corresponding to the limit value for acceleration of the tool will be explained. For example, as shown in FIG. 4, a case of a movement path defining point P10 as the starting point, having a portion curving in a circular arc (between points P11-P12, between points P13-P14, and between points P15-P16), and defining point P17 as the end point will be considered. At point P10 and point P17, the velocity of the tool must be zero. For this reason, the tool accelerates at the acceleration of the limit value from point P10, and decelerates at the acceleration of the limit value towards point P17. In addition, at a portion at which the movement path curves, acceleration acts in the radial direction of an arc (force opposing centrifugal force). The acceleration acting on the tool becomes greater as the curvature (inverse of radius) of the movement path increases. For this reason, in the case of moving the tool so as not to exceed the limit value for acceleration stored in the limit setting storage unit 12, it is necessary to cause the velocity of the tool to decline as the curvature increases. In addition, by the tool acceleration being limited, since it is not possible to fluctuate the velocity of the tool discontinuously at points P11, P13, P15 at which the movement path starts to curve, and points P12, P14, P15 finishing the curve, it is necessary to perform acceleration and deceleration of the tool at linear portions before and after these. For this reason, the limit velocity of the tool corresponding to the limit value for acceleration calculated based on the movement path in FIG. 4 comes to be such as that shown in FIG. 5.

Regarding the limit velocity corresponding to the limit value of other parameters, although explanation will be omitted, the velocity change of the tool such that does not exceed the limit value at which the parameter value is set in the limit setting storage unit 12 is respectively calculated.

The feedrate determination unit 26 defines the minimum value among the ideal velocity for the tool at each position of the movement path and the plurality of limit velocities, as the feedrate of the tool at each position of the movement path. In other words, the feedrate determination unit 26 determines the feedrate of the tool for every sampling cycle. In the case of the feedrate determination unit 26 defining any limit velocity as the feedrate of the tool, since the velocity of the tool is decelerated relative to the ideal velocity, such control is called deceleration control. Immediately after movement start from a stopped state of the tool and immediately before stopping, since the ideal velocity becomes relatively low speed, in many cases, the limit velocity is not defined as the feedrate of the tool (not decelerated).

The speed control unit 16 controls the servo amplifiers 3x, 3y, 3z so as to move the tool at the feedrate determined by the velocity projecting unit 15.

The deceleration recording unit 17 stores the type of the parameter (deceleration factor) corresponding to a case of the feedrate determination unit 26 defining the limit velocity as the feedrate. In addition, the deceleration recording unit 17 preferably stores the coordinates of the position at which defining the limit velocity as the feedrate or time together with the deceleration factor. Furthermore, the deceleration recording unit 17 is preferably configured so as to add the number of times that the feedrate determination unit 26 defined the limit velocity as the feedrate for every parameter.

The deceleration factor output unit 18, when the tool passes through a position at which the feedrate determination unit 26 defines the limit velocity as the feedrate, outputs a signal according to the type of parameter corresponding to the limit velocity defined as the feedrate by the feedrate determination unit 26. In other words, the deceleration factor output unit 18 monitors the actual movement of the tool by the speed control unit 16, and outputs a signal decided for every deceleration factor corresponding to the coordinate or time recorded in the deceleration recording unit 17.

Figure 6:
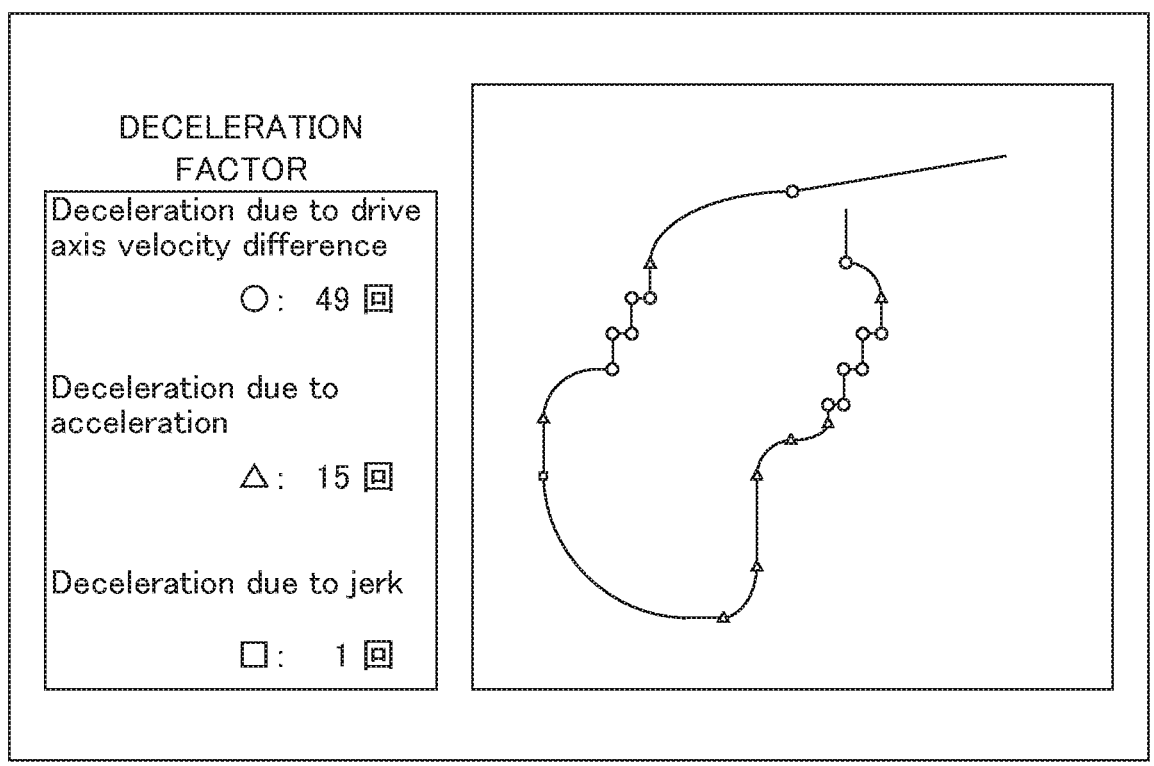
FIG. 6 is a view illustrating an image which can be displayed by a trajectory output unit of the numerical control device in FIG. 1.

The trajectory output unit 19 causes the trajectory of the tool to be displayed on the display device 23, as illustrated in FIG. 6. The trajectory output unit 19 preferably receives the signal outputted by the deceleration factor output unit 18, and causes a marker according to the type of parameter corresponding to the limit velocity defined as the feedrate to be displayed at the position at which the feedrate determination unit 26 defined the limit velocity as the feedrate to be displayed on the trajectory of the tool. In other words, the trajectory output unit 19 can be configured to cause the position of the tool which can be moved by the speed control unit 16 to be displayed on the display device 23, and cause the position at which decelerating due to the limit value of the parameter and type of deceleration factor thereof to be displayed on the display device 23.

The adjustment effect calculation unit 20 calculates variation in time (variation in movement time) required in order for the tool to move the entire movement path when changing the limit value of the parameter. The adjustment effect calculation unit 20 is preferably configured so as to be able to cause the calculated necessary time variation to be displayed on the display device 23.

The adjustment effect calculation unit 20 may calculate the variation $\Delta T$ in movement time by way of the following Formula (1) for every position at which defining the limit velocity as the feedrate of the tool, i.e. deceleration position, and calculate the variation in time required in order for the tool to move the entirety of the movement path by summing the variation of all deceleration positions. However, in Formula (1), $Vc_P$ is the limit velocity prior to limit value change, $Vc_R$ is the limit velocity after limit value change, V is the ideal velocity, A is the limit value prior to change in the acceleration of the tool, and J is the limit value prior to change in jerk of the tool.

$$\Delta T = \frac{2Vc_R - 2Vc_P}{A} - \frac{Vc_R^2 - Vc_P^2}{AV} + \frac{A(Vc_R - Vc_P)}{JV} \quad (1)$$

By using such Formula (1), it is possible to calculate the variation in time required in order for the tool to move the entirety of the movement path, in a relatively simple and relatively accurate manner.

When explaining Formula (1), the time T1p required in order to accelerate the tool from the limit velocity VcP prior to change at acceleration A to the ideal velocity V can be represented by the following Formula (2).

$$T1_P = \frac{V - Vc_P}{A} \quad (2)$$

In addition, the time T2p until the acceleration of the tool reaches the acceleration A at jerk J can be represented by the following Formula (3).

$$T2_P = \frac{A}{J} \quad (3)$$

For this reason, the time Tp required in order to accelerate from the limit velocity VcP up to the ideal velocity V at jerk J and maximum acceleration A can be represented by the following Formula (4).

$$T_P = T1_P - T2_P \quad (4)$$

The distance Xp by which the tool moves while accelerating from the limit velocity VcP until the ideal velocity V before change at jerk J and acceleration A can be represented by the following Formula (5).

$$X_P = V_{cp}(T1_P + T2_P) + (V - Vc_P)T2_P + \tfrac{1}{2}(V - Vc_P)(T1_P - T2_P) \quad (5)$$

When rearranging the right side of this Formula (5), it becomes the following Formula (6).

$$X_P = \tfrac{1}{2}(V + Vc_P)(T1_P + T2_P) \quad (6)$$

Similarly, the time T1R required in order to accelerate the tool from the limit velocity VcR up to the ideal velocity after the change at acceleration A can be represented by the following Formula (7).

$$T1_R = \frac{V - Vc_R}{A} \quad (7)$$

The time TR required in order to accelerate from the limit velocity VcR up to the ideal velocity V at the maximum acceleration A can be represented by the following Formula (8).

$$T_R = T1_R - T2_P \quad (8)$$

The distance XR by which the tool moves while accelerating from the limit velocity VcR up to the ideal velocity V prior to the change at jerk J and acceleration A can be represented by the following Formula (9).

$$X_R = \tfrac{1}{2}(V + Vc_R)(T1_R + T2_P) \quad (9)$$

The variation in time ΔT0 required in order to accelerate up to the ideal velocity V in a case of changing the limit velocity from VcP to VcR can be represented by the following Formula (10).

$$\Delta T_0 = (T_P - T_R) - \frac{X_P - X_R}{V} \quad (10)$$

When substituting Formulas (2) to (9) into this Formula (10), the following Formula (11) is derived.

$$\Delta T_0 = \frac{1}{2}\left(\frac{2Vc_R - 2Vc_P}{A} - \frac{Vc_R^2 - Vc_P^2}{AV} + \frac{A(Vc_R - Vc_P)}{JV}\right) \quad (11)$$

The variation ΔT0 in Formula (11) occurs during deceleration and during acceleration of the tool; therefore, the variation ΔT in the movement time per deceleration position is twice ΔT0, and thus can be represented as the aforementioned Formula (1).

When changing the limit value of a parameter in this way, by calculating the variation in movement time for each deceleration position using a relatively simple formula, it is possible to relatively accurately and rapidly estimate the variation in time required in order for the tool to move the entirety of the movement path.

The count output unit 21 causes the number of times summed by the deceleration recording unit 17 to be displayed on the display device 23 for every parameter (deceleration factor). The count output unit 21 may add the number of each deceleration factor to the trajectory output unit 19 and display, as shown in FIG. 6.

The input device 22 can be configured by a keyboard or the like, for example.

The display device 23 can be configured by a display panel or the like, for example. In addition, the display device 23 may be configured by a touch panel or the like which is integral with the input device 22.

Since the numerical control device 1 includes the adjustment effect calculation unit 20 which calculates the variation in the movement time relative to a change in the limit value of a parameter, and since it is possible to roughly confirm the variation in the movement time immediately by inputting a new limit value for a parameter, it is easy to reduce the movement time to within a desired time by changing the limit value of the parameter.

In addition, since the numerical control device 1 includes the deceleration recording unit 17 which records deceleration factors, it is possible to easily grasp the factor decelerating the tool. For this reason, the numerical control device 1 can grasp for which parameter the limit value changing is efficient, in a case of shortening the machining time by a change in limit value of the parameter; therefore, it is possible to shorten the machining time relatively easily while suppressing a decline in machining precision. In particular, the numerical control device 1 can more simply grasp for which parameter changing the limit value is efficient, since the deceleration recording unit 17 counts the deceleration number of times for every deceleration factor.

In addition, the numerical control device 1 can further simply shorten the machining time, since the count output unit 21 causes the deceleration number of times for every deceleration factory counted by the deceleration recording unit 17 to be displayed on the display device 23. In addition, since the trajectory output unit 19 displays as markers the deceleration factors on the trajectory of the tool, understanding for which parameter changing the limit value would be efficient becomes easy also thereby.

Although an embodiment of the present invention has been explained above, the present invention is not to be limited to the aforementioned embodiment. In addition, the effects described in the present embodiment are merely exemplifying the most preferred effects produced from the present invention, and the effects according to the present invention are not to be limited to those described in the present embodiment.

The numerical control device according to the present invention may be formed integrally with a control device which controls devices other than the machine tool or related equipment.

The numerical control device according to the present invention may control two or less, or four or more drive axes. In addition, the numerical control device according to the present invention can be applied not only to machine tools having a drive mechanism of Cartesian coordinate type having mutually perpendicular drive axes, but also to machine tools which move the tool by way of a drive mechanism of articulation type, drive mechanism of parallel link type or the like, for example.

In the numerical control device according to the present invention, the input device and display device are not essential, and may be a configuration using an external input device and display device by way of input/output of information (signals). In addition, the count output unit, deceleration factor output unit, trajectory output unit and adjustment effect calculation unit of the numerical control device according to the present invention may be configured not only to output information to constituent elements inside of the numerical control device, but also to output this information to external devices (computer device which manages the machine tool or the like, for example).

EXPLANATION OF REFERENCE NUMERALS

1 numerical control device
2x, 2y, 2z servomotor
3x, 3y, 3z servo amplifier
11 program storage unit
12 limit setting storage unit
13 program analysis unit
14 interpolation unit
15 velocity projecting unit
16 speed control unit
17 deceleration recording unit
18 deceleration factor output unit
19 trajectory output unit
20 adjustment effect calculation unit
21 count output unit
22 input device
23 display device
24 ideal velocity calculation unit
25 limit velocity calculation unit
26 feedrate determination unit

What is claimed is:

1. A numerical control device for a machine tool which causes a tool to move along a movement path decided according to a machining program, the numerical control device comprising a processor, the processor being configured to:
   set limit values of a plurality of parameters related to movement of the tool;
   calculate a plurality of limit velocities which are movement velocities of the tool, which respectively correspond to the limit values of the plurality of parameters at each position of the movement path;
   define a minimum value among an ideal velocity of the tool and the plurality of limit velocities at each position on the movement path as a feedrate of the tool at each position on the movement path;
   calculate a variation in movement time required in order to cause the tool to move an entirety of the movement path at the feedrate, due to a change in at least one of the limit values of the plurality of parameters; and
   adjust the at least one of the limit values of the plurality of parameters based on the calculated variation and to control the machine tool with the at least one of the adjusted limit values.

2. The numerical control device according to claim 1, wherein the plurality of parameters includes acceleration of the tool and jerk of the tool, and
   wherein the processor calculates the variation in the movement time for every position at which defining the limit velocity as feedrate of the tool, by way of Formula (1) below, $$\Delta T = \frac{2Vc_R - 2Vc_P}{A} - \frac{Vc_R^2 - Vc_P^2}{AV} + \frac{A(Vc_R - Vc_P)}{JV} \quad (1)$$

wherein, in Formula (1), $\Delta T$ is the variation in the movement time, $Vc_P$ is the limit velocity corresponding to the limit value prior to change, $Vc_R$ is the limit velocity corresponding to the limit value after change, V is the ideal velocity, A is the limit value prior to change of acceleration of the tool, and J is the limit value prior to change of jerk of the tool.

3. The numerical control device according to claim 1, wherein the processor is further configured to:
   sum, for each of the plurality of parameters, a number of times the limit velocity has been defined as the feedrate; and
   display the summed number of times for each of the parameters.

* * * * *